March 16, 1948. A. A. ZEISE 2,437,847
PRECISION LOCATING TOOL
Filed May 2, 1946
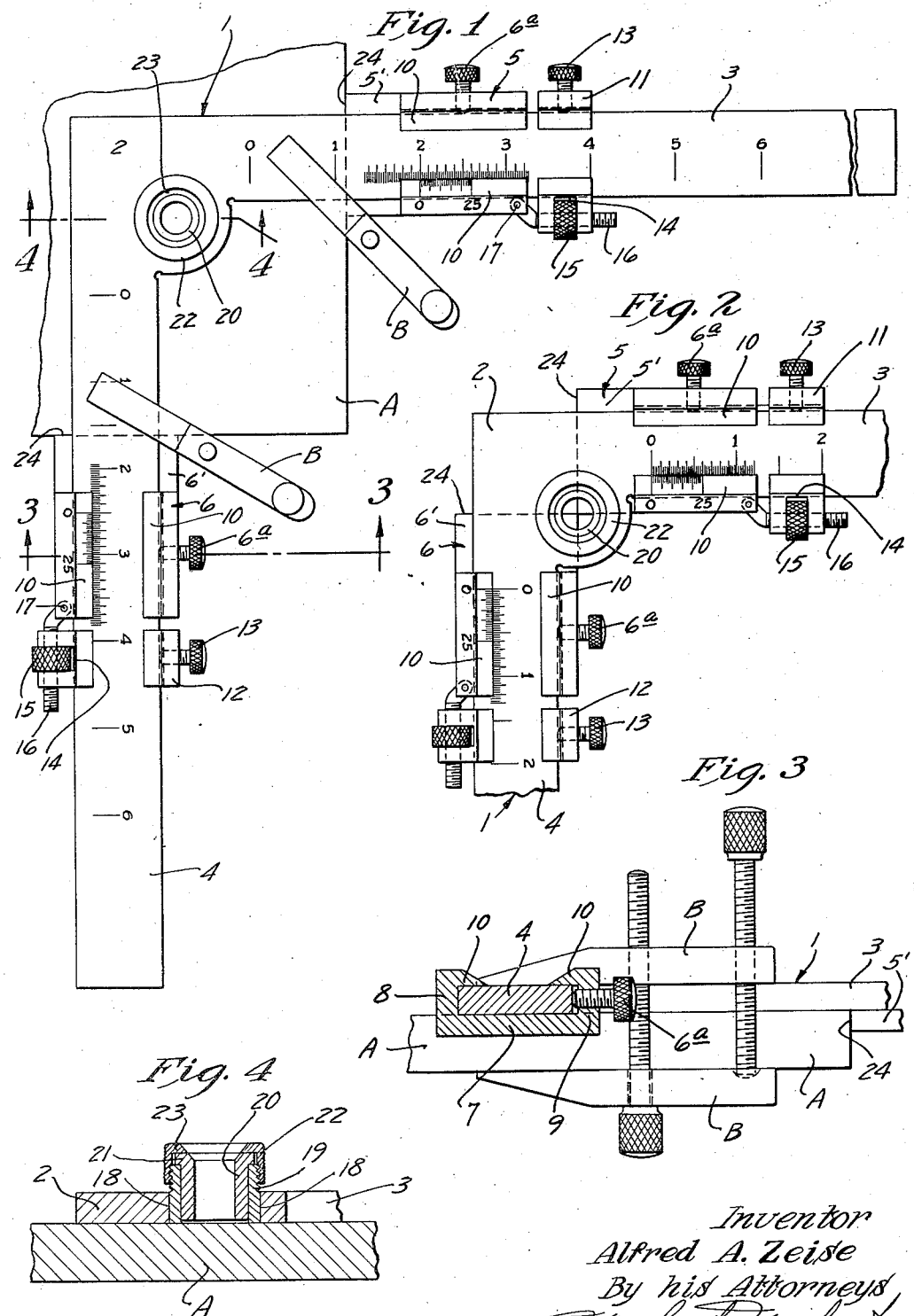
Inventor
Alfred A. Zeise
By his Attorneys
Merchant & Merchant Patented Mar. 16, 1948

2,437,847

UNITED STATES PATENT OFFICE 2,437,847

PRECISION LOCATING TOOL

Alfred A. Zeise, Minneapolis, Minn.

Application May 2, 1946, Serial No. 666,649

2 Claims. (Cl. 33—189)

My invention relates to improvements in precision locating tools and more specifically to a combination of hole locator and hole drilling jig.

My invention has for an object to provide a tool by which holes may be accurately located in work with relation to relatively perpendicular planes of the work.

Another object of my invention is to provide a tool wherein the desired measurements for the location of the hole may be effected accurately and easily.

Another object is to provide a tool to very accurately locate the center of a hole to be drilled without the use of supplementary measuring devices, such as micrometers or the like.

Another object of my invention is to provide a tool having the foregoing advantages and which is sufficiently light and compact to permit it to be a part of a workman's tool kit, to be carried with him and to be available always when needed.

The above and still further objects of my invention will become apparent from the following detailed specification, appended claims and attached drawings.

Referring to the drawings in which like characters indicate like parts throughout the several views:

Fig. 1 is a plan view of my device as shown applied to a workpiece, with some parts broken away;

Fig. 2 is a view corresponding to Fig. 1, with some parts broken away and showing a different setting of the parts;

Fig. 3 is an enlarged section taken on the line 3—3 of Fig. 1; and

Fig. 4 is a similarly enlarged section taken on the line 4—4 of Fig. 1.

Referring with greater particularity to the drawings, my novel device consists of a frame identified in its entirety by the numeral 1 and comprising a generally rectangular body portion 2 and arms 3 and 4, which project outwardly therefrom at right angles to one another. Arms 3 and 4, as shown particularly in Fig. 3, are in the same plane as each and the central body portion 2. The arms 3 and 4 and the body portion 2 are of a uniform thickness and preferably, and as shown, are formed from a single piece of stock, such as high carbon steel or the like.

Longitudinally slidably mounted on arms 3 and 4 are a pair of work-engaging blocks 5 and 6, respectively, which as shown particularly in Fig. 3, are channeled interiorly to receive arms 3 and 4, respectively, and comprise bottom portions 7, upstanding side walls 8 and 9 and inwardly-extending ledges 10, shown as being tapered. Blocks 5 and 6 are provided at one side with knurled locking thumb screws 6a. Arms 3 and 4 contain linear scale indicia, each thereof starting from zero adjacent the central body portion 2. It will be noted that this indicia extends slightly under one of the tapered ledges 10 of the slide blocks 5 and 6. The tapered ledges 10 likewise contain linear scale indicia which is adapted to cooperate with the linear scale indicia on the arms 3 and 4 to provide a vernier scale. It will be noted that the outside of arm 4 as well as the outside beveled ledge 10 of the slide block 6 contains the scale indicia, whereas the inside edge of arm 3 and the inside beveled ledge 10 of block 5 contain the scale indicia. The sole purpose in such an arrangement is to allow the blocks 5 and 6 to be identical in structure, thus facilitating the manufacture thereof.

Preferably, and as shown, each of the slide blocks 5 and 6 is provided with longitudinally-spaced supplemental blocks 11 and 12, respectively, each of which, at one of their sides, is equipped with a knurled locking thumb screw 13. At their opposite sides, supplemental blocks 11 and 12 are bifurcated at 14 to receive knurled adjusting thumb wheels 15 which have threaded engagement with adjusting studs 16. The adjusting studs 16 are mounted for sliding movement in the bifurcated side portions of the supplemental blocks 11 and 12 and at one end are anchored to the blocks 5 and 6 as at 17.

As shown in Fig. 1, my novel structure is shown as being clamped to a workpiece A by means of a pair of machinists' clamps or the like B. The object there sought to be achieved is the drilling of a hole two inches from the right side of the workpiece and two and one-half inches from the bottom thereof. To accomplish this, the slide block 5 is slid upon the arm 3 to a point where the zero on the beveled portion 10 is in approximate registration with the two inch designation of the scale on the arm 3. The thumb screw 13 is then tightened to lock supplemental block 11 to arm 3. A more precise adjustment of the block 5 may then be had by manipulation by the adjusting thumb wheel 15. The block 5 is then securely locked in place by means of thumb screw 6a. The same procedure is followed with respect to slide block 6 except that, of course, the zero mark on the slide block is brought into engagement with the two and one-half inch designation of the scale indicia of arm 4.

Mounted fast in a circular opening 18 in the central body portion 2, is an upstanding sleeve 19 which is threaded at its outer end. Slidably mounted in sleeve 19 is a jig bushing 20 having at its upper end an annular flange 21 which seats against the outer end of the sleeve 19. An annular clamping ring 22 is threaded for engagement with the threaded portion of the sleeve 19 and at its top is provided with an inwardly-extending radial flange 23 between which and the outer end of the sleeve 19 the flange 21 of the jig bushing is clamped. The outer peripheral portion of the clamping ring 22 is preferably knurled while the inner peripheral edge thereof is tapered to facilitate centering of a drill therein.

It is important that the work-engaging faces of the slide blocks 5 and 6, herein designated by the common number 24, intersect, particularly as shown in Fig. 2, at a point coincidental with the axis of the opening 18 in the central body portion 2. Furthermore, and as a result of this condition, the distances between the axis of the opening 18 and the zero designation on the linear scales 3 and 4 are equal to the distances between the work-engaging faces 24 of the blocks 5 and 6 and the zero marks of the ledges 10.

As shown, particularly with reference to Figs. 1 and 2, the work-engaging faces 24 are the leading edges of tongues 5' and 6' which underlie the arms 3 and 4, respectively. When the work-engaging faces 24 are in engagement, as shown in Fig. 2, they will be seen through the opening 18. This structure obviates the necessity of supplemental blocks in the drilling of holes at or near the edge of a workpiece.

In practice, the setting of the slide blocks 5 and 6 on arms 3 and 4 may be done in advance of placing of the frame 1 on the workpiece A. Thereafter, the frame is placed in position as indicated at Fig. 1 wherein the central body portion and the opening 18 overlie the work, and the work-engaging faces 14 of slide blocks 5 and 6 are in engagement with the righthand and bottom sides of the workpiece A. Subsequent to applying clamps B, a suitable size bushing 20 is inserted into sleeve 19. The same is locked in place by virtue of the clamping ring 22. By suitable size, is meant a bushing of a diameter to snugly embrace the drill bit inserted therethrough.

By proper utilization of my novel device, I have found that it is possible to achieve precision in the locating and boring of holes in a workpiece with precision heretofore accomplished only with jig bores or other equally costly and heavy equipment.

While I have shown a preferred embodiment of my invention as provided by sec. 4888 of the U. S. Statutes, it should be understood that the same is subject to modification without departure from the scope of the appended claims.

What I claim is:

1. In a device of the class described, a frame comprising a central body portion, a pair of arms projecting therefrom at right angles to one another and at the same plane to one another and to said body portion, linear scale indicia on said arms, workpiece-engaging blocks longitudinally slidably mounted on said arms, vernier scale indicia on said slide blocks, means for locking said blocks on said arms, an opening through said central body portion, work-engaging tongues projecting from said slide blocks and underlying said arms, and work-engaging faces on said tongues, said work-engaging faces being adapted to intersect at a point coincidental with the axis of the opening in said body portion.

2. In a device of the class described, a frame comprising a body portion and a pair of arms projecting therefrom at right angles to one another and in the same plane, linear scale indicia on said arms, work piece engaging blocks longitudinally slidably mounted on said arms, scale indicia on said slide blocks cooperating with the scale indicia on said arms, means for locking said slide blocks on said arms, and a drill-receiving opening in said central body portion having its axis coincidental to the point of intersection of the work-engaging faces of said slide blocks.

ALFRED A. ZEISE.

REFERENCES CITED

The following references are of record in the file of this patent:

UNITED STATES PATENTS

| Number | Name | Date |
|---|---|---|
| 41,005 | Hervey | Dec. 22, 1863 |
| 1,032,933 | O'Brien | July 16, 1912 |
| 1,191,906 | Miller | July 18, 1916 |
| 1,392,734 | Aldeen | Oct. 4, 1921 |
| 1,477,002 | Parkhill | Dec. 11, 1923 |
| 1,893,973 | Yavicoli | Jan. 10, 1933 |
| 2,341,107 | McDonald | Feb. 8, 1944 |
| 2,341,875 | Malik | Feb. 15, 1944 |
| 2,367,583 | Honyoust | Jan. 16, 1945 |